United States Patent [19]
Sublett

[11] Patent Number: 5,552,512
[45] Date of Patent: Sep. 3, 1996

[54] THERMOPLASTIC COPOLYESTERS HAVING IMPROVED GAS BARRIER PROPERTIES

[75] Inventor: Bobby J. Sublett, Kingsport, Tenn.

[73] Assignee: Eastman Chemical Company, Kingsport, Tenn.

[21] Appl. No.: 540,361

[22] Filed: Oct. 6, 1995

[51] Int. Cl.$^6$ .................................................. C08G 63/00
[52] U.S. Cl. .................................... 528/308; 528/308.6
[58] Field of Search .................................. 528/308, 308.6

[56] References Cited

U.S. PATENT DOCUMENTS

| | | | |
|---|---|---|---|
| 2,901,466 | 8/1959 | Kibler et al. | 528/288 |
| 5,254,610 | 10/1993 | Small, Jr. et al. | 524/120 |
| 5,340,624 | 8/1994 | Sublett | 528/308.6 |
| 5,352,401 | 10/1994 | Dalgewicz, III. et al. | 528/308 |

*Primary Examiner*—Tae Yoon
*Attorney, Agent, or Firm*—Harry J. Gwinnell; Karen A. Harding

[57] ABSTRACT

Disclosed are thermoplastic copolyesters having improved gas barrier properties and which can be produced having little or no acetaldehyde. These copolyesters are especially useful in the manufacture of food packaging products, foodtrays, film and beverage bottles which require good oxygen and carbon dioxide barrier properties. The copolyesters comprise repeat units from about 10 to 100 mole percent repeat units from naphthalene dicarboxylic acid, about 90 to 0 mole percent repeat units from terephthalic acid and repeat units from essentially 100 mole percent 1,4-cyclohexanedimethanol, wherein said 1,4-cyclohexanedimethanol has a cis isomer content of at least 50% said copolyester having an I.V. of about 0.4–1.2.

4 Claims, No Drawings

THERMOPLASTIC COPOLYESTERS HAVING IMPROVED GAS BARRIER PROPERTIES

TECHNICAL FIELD

This invention relates to thermoplastic copolyesters having improved gas barrier properties and which can be produced having essentially no acetaldehyde. These copolyesters are especially useful in the manufacture of food packaging products, foodtrays, film and beverage bottles which require good oxygen and carbon dioxide barrier properties.

BACKGROUND OF THE INVENTION

The present invention provides high molecular weight copolyesters exhibiting improved oxygen and carbon dioxide barrier properties, and little or no acetaldehyde is produced during manufacturing or processing. The invention provides copolyesters having better oxygen and carbon dioxide barrier properties than poly(ethylene terephthalate) which is used universally for food packaging, carbonated soft drink bottles and the packaging applications which require good oxygen and carbon dioxide barrier properties. Poly(ethylene terephthalate) can undergo degradation during preparation and conversion into film, bottles and other packaging materials with the evolution of acetaldehyde. Ultimately, the acetaldehyde becomes entrained in the polyester. The products made therefrom can be adversely affected by the taste of the packaged food or beverage as it diffuses from the material into the food. The polyesters disclosed herein do not generate acetaldehyde and show barrier properties equal to or superior to poly(ethylene terephthalate). These polymers with better oxygen and carbon dioxide barrier properties should fill needs that require better barrier properties than can be provided with poly(ethylene terephthalate).

Copolyester of poly(1,4-cyclohexylenedimethylene terephthalate) having cis and trans isomers of 1,4-cyclohexanedimethanol were disclosed by Kibler, Bell and Smith in U.S. Pat. No. 2,901,466 in 1959. Numerous patents exist wherein poly(ethylene 2,6 napthalene-dicarboxylate) is tauted as having excellent oxygen and carbon dioxide barrier properties. I am unaware of any disclosure of a copolyester having good oxygen and carbon dioxide barrier properties wherein the copolyester is made up of repeat units from naphthalene dicarboxylic acid, terephthalic acid, and high cis isomer content 1,4-cyclohexanedimethanol.

DESCRIPTION OF THE INVENTION

We have unexpectedly found a copolyester system having oxygen and carbon dioxide barrier properties superior to poly(ethylene terephthalate), a polyester which is used extensively for soft drink bottles. These thermoplastics are useful as film, fiber, bottles and food packaging devices such as food trays, and lidding materials. These polyesters have excellent physical properties as well as oxygen and carbon dioxide barrier properties equal to or considerably better than poly(ethylene terephthalate) which make them extremely useful as barrier materials.

Thus, according to this invention, there are provided copolyesters having improved barrier properties with respect to oxygen and carbon dioxide comprising repeat units from about 10 to about 100 mole percent naphthalene dicarboxylic acid, about 90 to 0 mole percent terephthalic acid and essentially 100 mole percent 1,4-cyclohexanedimethanol, wherein the 1,4-cyclohexanedimethanol has a cis isomer content of at least 50%, the copolyester having an I.V. of about 0.4–1.2.

Conventional processes well known in the art may be used for producing the copolyesters from terephthalic acid or lower dialkyl esters thereof, 2,6-naphthalene dicarboxylic acid or lower dialkyl esters thereof, and 1,4-cyclohexanedimethanol having a cis isomer content of at least 50%.

Terephthalic acid and 2,6-naphthalene dicarboxylic acid and their lower dialkyl esters (especially dimethyl esters) are well known, commercially available monomers. 1,4-Cyclohexanedimethanol having high cis isomer content (at least 50% cis isomer) may be prepared by those skilled in the art.

A method for isolating CHDM having a cis content of 50–100% will now be described. An equilibrium mixture containing about 32% cis isomer is dissolved in hot ethyl acetate having a temperature of about 70° C. The mixture is cooled to about 23° C. whereby an essentially pure trans CHDM crystallizes and is separated in a centrifuge. The cis-enriched filtrate is subjected to vacuum whereby ethyl acetate solvent is removed by vacuum distillation to leave a residue of CHDM having a cis-isomer content of 50% (by weight) or higher. Other methods of separation are well known in the art.

Minor amounts of modifying dicarboxylic acids and glycols may be used in the preparation of the copolyesters. If used at all (preferably less than about 20 percent), acids and glycols may be selected from ethylene glycol, diethylene glycol, propane-1,3-diol, butane-1,4-diol, polytetramethylene glycol, polyethylene glycol, polypropylene glycol, neopentyl glycol and the like, isophthalic, dibenzoic, adipic, sebacic, decane-1,10-dicarboxylic, diglycolic acid and the like.

In general, the copolyesters would be prepared using a combination of first melt phase and then solid phase esterification and polycondensation, both processes being well known in the art. The process is continued until the desired I.V. (inherent viscosity) is reached.

In addition, the polymer mixture can include various additives that do not adversely affect the polymer in use such as stabilizers, e.g., antioxidants or ultraviolet light screening agents, extrusion aids, additives designed to make the polymer more degradable or combustible, such as oxidation catalyst, as well as dyes or pigments.

Following preparation, the copolyesters are normally pelletized by well known means, and are subsequently formed into useful articles such as by extrusion, injection molding, combinations of extrusion or injection molding with blow molding, etc.

EXAMPLES

The following examples submitted for a better understanding of the invention.

Typical Copolyester Preparation

In a 500 mL round bottom flask equipped with a ground glass head, a stirrer shaft, nitrogen inlet and side arm is charged 48.5 grams (0.25 moles) of dimethyl terephthalate, 61 grams (0.25 moles) of dimethyl 2,6-napthalenedicarboxylate, 79.2 grams (0.55 moles) of 1,4-cyclohexanedimethanol (95.5/4.5)(cis/trans) mixture and 1.42 mL of a butanol solution of titanium tetraisopropoxide containing 0.0102 gram of titanium per milliliter. The flask is immersed in a Belmont metal bath preheated to 200° C. and as soon as the flask is immersed the temperature of the bath is reset to 290° C. The reaction mixture is stirred for approximately 45 minutes until the bath temperature reaches 290° C. After this time the theoretical amount of methanol has been collected and the pressure in the flask is reduced to 0.1 to 0.5 mm of mercury. This temperature and pressure are maintained for 1 hour. The metal bath is lowered away from the flask, the vacuum outlet is clamped off, the nitrogen inlet is opened and the flask is allowed to come to atmospheric pressure under a nitrogen blanket. The copolymer is allowed to cool to room temperature. This melt phase prepared copolyester has an inherent viscosity of 0.72. This is a typical laboratory preparation of copolyesters disclosed in this invention.

All copolyesters were extruded into film and the film stretched and oriented 3×3 using a T. M. Long stretching apparatus. The oxygen and carbon dioxide transmission rates were determined on film using ASTM standards D3985 and D1434 respectively.

Table 1 consists of nine examples of film showing polyester composition inherent viscosity, glass transition temperature and oxygen permeability. To be used to mold soft drink bottles, the oxygen barrier in cc mil/100 in.$^2$ 24 hours is 6.61. This is a typical value for any soft drink poly(ethylene terephthalate) bottle. Examples 1, 2, and 5 in Table 1 show three copolyesters containing greater than 90% cis 1,4-cyclohexanedimethanol (CHDM) copolymerized, with 10, 30, and 50 mole percent of 2,6-napthalene-dicarboxylate. These show oxygen barrier 1 to 2.4 times better than poly(ethylene terephthalate) shown in Example 9, Table 1.

is probably within experimental error and considered to be no significant difference. Example 8 is a copolyester containing 100 mole percent 2,6-napthalene dicarboxylic acid, high cis (85%) CHDM isomer and has oxygen barrier properties more than 4 times better than poly(ethylene terephthalate) shown in Example 9.

Example 3 is composed of 50/50 mole percent of dimethylterephthalate and 2,6-dimethylnaphthalate and 50/50 cis/trans isomers of 1,4-cyclohexanedimethanol. The oxygen permeability of this polymer is 6.51 cc mil/100 in.$^2$ 24 hours atom compared to 6.61 for poly(ethylene terephthalate) shown in Example 9. These values are not considered to be significantly different. This example is to show that even a low concentration of cis CHDM (50%) is useful.

Example 4 may be compared to Example 1. Example 4 contains 75 mole percent cis isomer rather than 95 mole percent as in Example 1. The oxygen barrier is still approximately 1.3 times better than poly(ethylene terephthalate) shown in Example 9.

These examples are intended to show that a family of copolyesters having excellent oxygen barrier properties have been discovered and that the combination of high cis 1,4-cyclohexanedimethanol is necessary to achieve the improved barrier and that the discovered isomorphism of the 2,6- to napthalenedicarboxylate and terephthalate with 1,4-cyclohexanedimethanol provides the crystallinity to make these copolyesters excellent oxygen barrier polymers.

TABLE 1

|  | Example 1 | Example 2 | Example 3 | Example 4 | Example 5 | Example 6 | Example 7 | Example 8 | Example 9** |
| --- | --- | --- | --- | --- | --- | --- | --- | --- | --- |
| See Note 1 | 70 | 50.5 | 49.7 | 69.3 | 89.8 | 100 | 100 | 0 | 100 |
| See Note 2 | 30 | 49.5 | 50.3 | 30.7 | 10.2 | 0 | 0 | 100 | 0 |
| See Note 3 | 95 | 93 | 50.4 | 74.81 | 94.5 | 50 | 90 | 85 | 0 (glycol is ethylene glycol) |
| See Note 4 | 5 | 7 | 49.6 | 25.19 | 5.5 | 50 | 10 | 15 | 0 (glycol is ethylene glycol |
| Inherent Viscosity (dL/g) | 0.748 | 0.714 | 0.72 | 0.76 | 0.82 | 0.729 | 0.726 | 0.669 | 0.75 |
| Glass Transition Temperature (Tg) | 86.5 | 93.6 | 107 | 94.18 | 82.07 | 86.83 | 78.51 | 109.92 |  |
| Melting Point (Tm) | 214.2 | 275.9 | 230.1 | 210.3 | 237.93 | 271.71 | 252.92 | 280.85 |  |
| Unoriented Film Oxygen Permeability* | 11.75 | 10.88 | 20.35 | 18.39 | 5.2 | 29.95 | 17.53 | 7.08 | 11.57 |
| Oriented Film Oxygen Permeability* *cc mil/100 in$^2$ 24 hr atm | 3.39 | 2.68 | 6.51 | 5.13 |  | 12.01 | 6.31 | 1.47 | 6.61 |

Note:
1 - Mol % repeat units from terephthalic acid
2 - Mol % repeat units from naphthalene dicarboxylic acid
3 - Mol % repeat units from cis CHDM
4 - Mol % repeat units from trans CHDM Example 6 which contains a 50/50 mixture of the cis/trans isomers of 1,4-cyclohexanedimethanol and no 2,6-napthalenedicarboxylate has much worse oxygen barrier property than the poly(ethylene terephthalate) shown in Example 9.

Example 7, Table 1, contains no 2,6-napthalene-dicarboxylate and high (90% cis CHDM) and is approximately equivalent in oxygen permeability to Example 9 (polyethylene terephthalate). Oxygen permeabilities are 6.31 and 6.61 cc mil/100 in.$^2$ 24 hours respectively, which difference I.V. is measured in a 60/40 parts by weight solution of phenol/tetrachloroethane 25° C. and at a concentration of about 0.5 gram of polymer in 100 mL of the solvent.

Oxygen permeability is measured by ASTM D 3985, in cubic centimeters permeating a 1-mil thick sample, 100 inches square, for a 24-hour period under oxygen partial pressure difference of one atmosphere at 30° C. and 68% relative humidity using a MOCON Oxtran 10–50 instrument.

Unless otherwise specified, all parts, ratios, percentages, etc., are by weight.

The invention has been described in detail with particular reference to preferred embodiments thereof, but it will be understood that variations and modifications can be effected within the spirit and scope of the invention.

I claim:

1. Copolyesters having improved barrier properties with respect to oxygen and carbon dioxide comprising repeat units from about 10 to 100 mole percent repeat units from naphthalene dicarboxylic acid, about 90 to 0 mole percent repeat units from terephthalic acid and repeat units from essentially 100 mole percent 1,4-cyclohexanedimethanol, wherein said 1,4-cyclohexanedimethanol has a cis isomer content of at least 50%, said copolyester having an I.V. of about 0.4–1.2.

2. Copolyesters according to claim 1 wherein the I.V. is about 0.7–0.8.

3. An article of manufacture comprising the copolyester of claim 1.

4. A container comprising the copolyester of claim 1.

* * * * *